(12) United States Patent
Zhuo et al.

(10) Patent No.: US 12,363,608 B2
(45) Date of Patent: Jul. 15, 2025

(54) ROUTING METHOD AND APPARATUS

(71) Applicant: HUAWEI TECHNOLOGIES CO., LTD., Guangdong (CN)

(72) Inventors: Yibin Zhuo, Shenzhen (CN); Yuanping Zhu, Shanghai (CN); Yulong Shi, Beijing (CN); Mingzeng Dai, Shenzhen (CN); Jing Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 378 days.

(21) Appl. No.: 17/672,363

(22) Filed: Feb. 15, 2022

(65) Prior Publication Data

US 2022/0174579 A1 Jun. 2, 2022

Related U.S. Application Data

(63) Continuation of application No. PCT/CN2020/109388, filed on Aug. 14, 2020.

(30) Foreign Application Priority Data

Aug. 15, 2019 (CN) .......................... 201910755511.7

(51) Int. Cl.
*H04W 40/22* (2009.01)
*H04L 45/74* (2022.01)
*H04L 69/22* (2022.01)

(52) U.S. Cl.
CPC ............ *H04W 40/22* (2013.01); *H04L 45/74* (2013.01); *H04L 69/22* (2013.01)

(58) Field of Classification Search
CPC . H04W 40/22; H04W 84/047; H04W 88/085; H04W 40/02; H04L 45/74;
(Continued)

(56) References Cited

U.S. PATENT DOCUMENTS

| 10,742,548 B1 * | 8/2020 | Sitaraman ............... H04L 43/12 |
| 2003/0031180 A1 * | 2/2003 | Datta .................... H04L 69/163 370/392 |

(Continued)

FOREIGN PATENT DOCUMENTS

| CN | 107852363 A | 3/2018 |
| CN | 109996306 A | 7/2019 |

(Continued)

OTHER PUBLICATIONS

U.S. Appl. No. 62/886,544, filed Aug. 14, 2019. (Year: 2019).*

(Continued)

*Primary Examiner* — Sun Jong Kim
(74) *Attorney, Agent, or Firm* — Fish & Richardson P.C.

(57) ABSTRACT

The disclosure provides routing methods and apparatuses. One example method includes that a first node receives a data packet. The first node determines a Backhaul Adaptation Protocol (BAP) header in the data packet, where the BAP header includes a BAP address of a destination node of the data packet and first information. The first information is used to determine whether the BAP header includes a routing path identifier of the data packet. The first node sends the data packet including the BAP header to the destination node based on the BAP header.

15 Claims, 9 Drawing Sheets

(58) Field of Classification Search
CPC ....... H04L 69/22; H04L 45/302; H04L 45/24; H04L 45/28
See application file for complete search history.

(56) References Cited

U.S. PATENT DOCUMENTS

| | | | |
|---|---|---|---|
| 2005/0147028 A1* | 7/2005 | Na | H04L 45/76 370/217 |
| 2007/0110034 A1 | 5/2007 | Bennett | |
| 2011/0060844 A1* | 3/2011 | Allan | H04L 12/66 709/241 |
| 2014/0153472 A1* | 6/2014 | Phan | H04L 5/0032 370/312 |
| 2016/0021005 A1* | 1/2016 | Kiyose | H04L 45/66 370/401 |
| 2018/0027444 A1 | 1/2018 | Maria | |
| 2019/0223078 A1 | 7/2019 | Sirotkin et al. | |
| 2021/0051512 A1* | 2/2021 | Hampel | H04W 80/06 |
| 2022/0225207 A1* | 7/2022 | Malkamäki | H04W 40/248 |

FOREIGN PATENT DOCUMENTS

| | | |
|---|---|---|
| CN | 110035042 A | 7/2019 |
| WO | 2019128947 A1 | 7/2019 |

OTHER PUBLICATIONS

Qualcomm Incorporated, "IAB transport at IAB-donor DU," 3GPP TSG-RAN WG3 #104, R3-192478, Reno, NV, USA, May 13-17, 2019, 4 pages.
Office Action in Japanese Appln. No. 2022-509714, dated Feb. 28, 2023, 10 pages (with English translation).
Office Action issued in Chinese Application No. 201910755511.7 on Jul. 4, 2022, 7 pages.
3GPP TS 38.473 V15.6.0 (Jul. 2019), "3rd Generation Partnership Project; Technical Specification Group Radio Access Network; NG-RAN; F1 application protocol (F1AP)(Release 15)," Jul. 2019, 220 pages.
Ericsson, "Summary of offline discussion: CB: # 39_Email039-IAB_integration," 3GPP TSG-RAN WG3 Meeting #107-e, R3-201139, Feb. 24-Mar. 6, 2020, 13 pages.
Ericsson, "User Plane Aspects of Supporting NR-DC for IAB Nodes," 3GPP TSG-RAN WG2#106, R2-1906998, Reno, USA, May 13-17, 2019, 5 pages.
Intel Corporation, "Offline 104 (BAP layer)," 3GPP TSG RAN WG2 Meeting #106, R2-1908156, Reno, USA., May 13-17, 2019, 7 pages.
PCT International Search Report and Written Opinion issued in International Application No. PCT/CN2020/109388 on Oct. 30, 2020, 19 pages (with English translation).
Qualcomm Incorporated, "Status on RAN WI NR_IAB," 3GPP TSG SA WG3 (Security) Meeting #95, S3-191516, Reno, USA, May 6-10, 2019, 11 pages.
Qualcomm Incorporated, "Status Report to TSG. Integrated Access and Backhaul for NR," 3GPP TSG RAN meeting #84, RP-191454, Newport Beach, USA, Jun. 3-6, 2019, 46 pages.
Ericsson, "IAB Integration and Associated BH Bearer and BAP Handling," 3GPP TSG-RAN WG3 Meeting #104, R3-192429, Reno, USA, May 13-17, 2019, 8 pages.
Extended European Search Report issued in European Application No. 20852003.1 on Aug. 5, 2022, 12 pages.
Huawei, "Routing Table Design and Configuration," 3GPP TSG-RAN WG3 Meeting #104, R3-192822, Reno, USA, May 13-17, 2019, 4 pages.
Huawei, "(TP for NR_IAB BL CR for TS 38.401): Integration of IAB node," 3GPP TSG-WG3 Meeting #105bis, R3-195446, Chongqing, China, Oct. 14-18, 2019, 6 pages.

* cited by examiner

Path
identifier

ROUTING METHOD AND APPARATUS

CROSS-REFERENCE TO RELATED APPLICATIONS

This application is a continuation of International Application No. PCT/CN2020/109388, filed on Aug. 14, 2020, which claims priority to Chinese Patent Application No. 201910755511.7, filed on Aug. 15, 2019. The aforementioned applications are hereby incorporated by reference in their entireties.

TECHNICAL FIELD

This application relates to the field of communication technologies, and in particular, to a routing method and apparatus.

BACKGROUND

Compared with a fourth-generation mobile communication system, the 5th Generation (5G) mobile communication has stricter requirements for network performance indicators, for example, a capacity indicator increased by 1000 times, wider coverage, and ultra-high reliability and ultra-low latency. In some scenarios, as high-frequency carrier frequency resources are abundant, high-frequency small-cell networking is increasingly popular in hotspot areas to meet a 5G ultra-high capacity requirement. However, a high-frequency carrier has poor propagation characteristics, severe attenuation due to obstruction, and limited coverage. Therefore, a large quantity of densely deployed small cells are required. Correspondingly, it is costly to provide optical backhaul for the densely deployed small cells and construction is difficult. Therefore, a more economical and convenient backhaul solution is required. In other scenarios, from the perspective of wide coverage requirements, it is difficult and costly to deploy optical fibers to provide network coverage in some remote areas. An economical and convenient backhaul solution is also urgently needed. An integrated access and backhaul (IAB) technology provides an idea to resolve the foregoing problems. Both an access link and a backhaul link in the technology use a wireless transmission solution, in which fiber deployment is avoided.

In an IAB network, a relay node (RN) is also referred to as an IAB node, and may provide a radio access service for user equipment (UE). Service data of the UE is transmitted by one or more IAB nodes connected to an IAB donor through a wireless backhaul link.

In discussion of an existing routing mechanism of IAB, one routing table is configured for each IAB node. Each routing table includes at least the following information: a destination node of a data packet and a next-hop node corresponding to the destination node. Optionally, the routing table may further include a routing path identifier of the data packet. One destination node may correspond to one or more routing path identifiers. In this routing mode, how an IAB node implements routing of a data packet is being discussed.

SUMMARY

Embodiments of this application provide a routing method and apparatus, to resolve a problem about how an IAB node implements routing of a data packet.

According to a first aspect, an embodiment of this application provides a routing method. The method includes: A first node receives a data packet. The first node determines a BAP header in the data packet, where the BAP header includes a BAP address of a destination node of the data packet and first information and the first information is used to determine whether the BAP header includes a routing path identifier of the data packet. The first node sends the data packet including the BAP header to the destination node based on the BAP header.

With the foregoing method, after receiving the data packet, the first node determines the BAP header in the data packet, where the BAP header includes the BAP address of the destination node of the data packet and the first information. Therefore, this embodiment of this application provides a new format of the BAP header. Further, the first node may send the data packet including the BAP header to the destination node based on the BAP address of the destination node of the data packet and the first information that are in the BAP header, so as to implement routing of the data packet.

In a possible design, the first information is a routing path identifier of the data packet. If the routing path identifier of the data packet is a preset value, the preset value is used to disable the routing path identifier of the data packet. The foregoing design can ensure that the BAP header has a unified format and the length of the BAP header remains unchanged regardless whether there is a routing path identifier of the data packet.

Alternatively, the first information includes an indication field. The indication field is used to indicate whether the BAP header includes the routing path identifier of the data packet. If the indication field indicates that the BAP header includes the routing path identifier of the data packet, the first information further includes the routing path identifier of the data packet. The foregoing design can reduce header overheads when the BAP header does not include the routing path identifier of the data packet.

In a possible design, the first information further includes a BAP address of a source node of the data packet.

In a possible design, that the first node determines a BAP header in the data packet may mean that the first node determines the BAP header added to the data packet.

In a possible design, the method further includes: The first node removes an old BAP header from the data packet, and adds the BAP header to the data packet.

In a possible design, the method further includes: The first node determines a next-hop node of the first node on a routing path of the data packet based on the BAP header in the data packet and a common field in the BAP header and a routing table.

In a possible design, the routing path of the data packet is a first path between the first node and the destination node. The first path is a first default routing path between the first node and the destination node; the first path is a routing path with a highest priority in at least one routing path between the first node and the destination node in a routing table of the first node; or the first path is a routing path determined by the first node from a plurality of routing paths between the first node and the destination node based on a preset relationship between a data volume buffered by the first node and a preset threshold. Alternatively, the first path is a routing path determined by the first node from a plurality of routing paths between the first node and the destination node based on preset ratio information, where the preset ratio information is ratio information of a quantity of transmitted data packets corresponding to each of the plurality of routing paths. Alternatively, the first path is a routing path determined by the first node based on indication information carried in the data packet.

With the foregoing design, the first node may determine a routing path between the first node and the destination node, and send the data packet to the destination node based on the routing path between the first node and the destination node, so that data packet offloading in an IAB network can be implemented.

In a possible design, that the first node determines a BAP header in the data packet may mean that when the first node determines that a radio link of the first path fails or is congested and that a second node other than the destination node exists, the first node changes the BAP address of the destination node in the BAP header in the data packet to a BAP address of the second node. The data packet is an uplink data packet, and the second node is another distributed unit of an integrated access and backhaul (IAB) donor to which the destination node before the change belongs.

With the foregoing design, when the first node determines that the radio link of the routing path for sending the data packet to the destination node fails or is congested, the first node may re-determine a BAP address of a destination node of the data packet and perform routing based on the BAP address of the new destination node. In this way, the data packet can be sent to the new destination node in time without waiting for the radio link to recover, thereby better meeting a service latency requirement.

In a possible design, that the first node determines a BAP header in the data packet may mean that when the first node determines that a radio link of the first path fails or is congested and that a second node other than the destination node exists, the first node changes the BAP address of the destination node in the BAP header in the data packet to a BAP address of the second node. The data packet is a downlink data packet, and the second node is another IAB node accessed by a terminal device that receives the data packet.

With the foregoing design, when the first node determines that the radio link of the routing path for sending the data packet to the destination node fails or is congested, the first node may re-determine a BAP address of a destination node of the data packet and perform routing based on the BAP address of the new destination node. In this way, the data packet can be sent to the new destination node in time without waiting for the radio link to recover, thereby better meeting a service latency requirement.

In a possible design, that the first node sends the data packet including the BAP header to the destination node based on the BAP header may mean that when the first node determines that a radio link of the routing path of the data packet fails or is congested, the first node sends the data packet including the BAP header to the destination node through a second path. The second path is a path between the first node and the destination node.

With the foregoing design, when the first node determines that the routing path of the data packet is unavailable, the first node may re-determine a new routing path between the first node and the destination node as the routing path of the data packet. In this way, the data packet can be sent to the destination node in time through another routing path without waiting the radio link to recover, thereby better meeting a service latency requirement.

In a possible design, the method further includes: If the data packet is a downlink data packet, the first node determines the BAP address of the destination node based on a mapping relationship between an IP address of the destination node and a BAP address of the destination node.

With the foregoing method, the first node determines the BAP address of the destination node to enable routing of the data packet, thereby implementing data packet offloading in the IAB network.

In a possible design, if the data packet is an uplink data packet, the method further includes: The first node uses a BAP address that is of a distributed unit of an IAB donor and that is configured by a centralized unit of the IAB donor for the first node as the BAP address of the destination node; or the first node determines the BAP address of the destination node based on a mapping relationship between a destination CU-CP and the BAP address of the destination node.

With the foregoing method, the first node determines the BAP address of the destination node to enable routing of the data packet, thereby implementing data packet offloading in the IAB network.

In a possible design, if the data packet is an uplink data packet, the destination node is a distributed unit of an IAB donor, the first node is an access IAB node, or an intermediate IAB node between an access IAB node and the IAB donor, and the source node is the access IAB node. The access IAB node is a node accessed by a terminal device that sends the uplink data packet.

In a possible design, if the data packet is a downlink data packet, the destination node is an access IAB node, the first node is a distributed unit of an IAB donor, or an intermediate IAB node between a distributed unit of an IAB donor and the access IAB node, and the source node is a distributed unit of the IAB donor. The access IAB node is a node accessed by a terminal device that receives the downlink data packet.

According to a second aspect, an embodiment of this application provides a communication apparatus, for example, a first node. The apparatus may be an IAB node, or may be a chip in the IAB node, or the apparatus may be a donor DU, or may be a chip in the donor DU. The apparatus may include a processing unit, a sending unit, and a receiving unit. It should be understood that the sending unit and the receiving unit herein may alternatively be a transceiver unit. When the apparatus is an IAB node or a donor DU, the processing unit may be a processor, and the sending unit and the receiving unit may be a transceiver. The IAB node or the donor DU may further include a storage unit, and the storage unit may be a memory. The storage unit is configured to store instructions, and the processing unit executes the instructions stored in the storage unit, so that the terminal device performs the method according to any one of the first aspect or the possible designs of the first aspect. When the apparatus is a chip in an IAB node or a donor DU, the processing unit may be a processor, and the sending unit and the receiving unit may be an input/output interface, a pin, a circuit, or the like. The processing unit executes instructions stored in a storage unit, so that the chip performs the method according to any one of the first aspect or the possible designs of the first aspect. The storage unit is configured to store the instructions, and the storage unit may be a storage unit (for example, a register or a cache) in the chip, or may be a storage unit (for example, a read-only memory or a random access memory) that is in the IAB node or the donor DU and that is located outside the chip.

According to a third aspect, an embodiment of this application further provides a computer-readable storage medium. The computer-readable storage medium stores a computer program, and when the computer program is run on a computer, the computer is enabled to perform the method according to the first aspect.

According to a fourth aspect, an embodiment of this application further provides a computer program product including a program. When the computer program product runs on a computer, the computer is enabled to perform the method according to the first aspect.

According to a fifth aspect, an embodiment of this application further provides a communication system. The communication system includes a source node, a destination node, and at least one first node. The first node is an intermediate node between the source node and the destination node on a routing path of a data packet. The first node performs the method according to any one of the first aspect or the possible designs of the first aspect.

According to a sixth aspect, an embodiment of this application further provides a communication system. The communication system includes a first node and a destination node. The first node is a source node on a routing path of a data packet. The first node performs the method according to any one of the first aspect or the possible designs of the first aspect.

In a possible design, the communication system further includes at least one intermediate node. The intermediate node is an intermediate node between the first node and the destination node on the routing path of the data packet. The intermediate node performs the method according to any one of the first aspect or the possible designs of the first aspect.

According to a seventh aspect, an embodiment of this application provides an uplink data transmission method. The method includes: A first node obtains a mapping relationship between an Internet Protocol (IP) address of a destination centralized unit-user plane (CU-UP) configured by a donor centralized unit (donor CU) and a Backhaul Adaptation Protocol (BAP) address of a destination node, where the first node is an integrated access and backhaul (IAB) node. The first node determines the BAP address of the destination node based on the mapping relationship. The first node determines a first path between the first node and the destination node based on a tunnel endpoint identifier that is in a GPRS Tunneling Protocol User Plane and that is carried in an uplink data packet. The first node sends the uplink data packet to the destination node on the first path based on the BAP address of the destination node.

With the foregoing method, the first node determines the BAP address of the destination node based on an IP address of a destination CU-UP carried in the uplink data packet, so as to enable routing of the data packet. Further, different BAP addresses of destination nodes can be configured for data packets with different service requirements or data packets with different terminating nodes. In this way, data packet offloading in an IAB network can be implemented.

In a possible design, when the first node determines the first path between the first node and the destination node based on the tunnel endpoint identifier that is in the GPRS Tunneling Protocol User Plane and that is carried in the uplink data packet, the first node obtains a mapping relationship between the first path and the tunnel endpoint identifier that is configured by the donor CU and determines the first path based on the mapping relationship and the tunnel endpoint identifier that is in the GPRS Tunneling Protocol User Plane and that is carried in the uplink data packet.

In a possible design, the method further includes: The first node determines to add a BAP header to the uplink data packet, where the BAP header includes the BAP address of the destination node and an identifier of the first path.

In a possible design, the first path is a routing path with a routing path identifier that is unique in an entire network or in the donor CU.

In a possible design, the destination node is a donor distributed unit (donor DU).

According to an eighth aspect, an embodiment of this application provides a downlink data transmission method. The method includes: A first node obtains a mapping relationship between an Internet Protocol (IP) address of a destination node configured by a donor centralized unit (donor CU) and a Backhaul Adaptation Protocol (BAP) address of the destination node, where the first node is a donor distributed unit (donor DU). The first node determines the BAP address of the destination node based on the mapping relationship and the IP address of the destination node that is carried in a downlink data packet. The first node determines a first path between the first node and the destination node based on a differentiated services code point (DSCP) or a flow label (flow label) carried in the downlink data packet. The first node sends the downlink data packet to the destination node on the first path based on the BAP address of the destination node.

With the foregoing method, the first node may determine a routing path between the first node and the destination node, and send the data packet to the destination node based on the routing path between the first node and the destination node, so that data packet offloading in an IAB network can be implemented.

In a possible design, when the first node determines the first path between the first node and the destination node based on the DSCP or the flow label carried in the downlink data packet, the first node obtains a mapping relationship between the first path and the DSCP or the flow label that is configured by the donor CU and determines the first path based on the DSCP or the flow label and the mapping relationship.

In a possible design, the method further includes: The first node determines to add a BAP header to the downlink data packet, where the BAP header includes the BAP address of the destination node and an identifier of the first path.

In a possible design, the first path is a routing path with a routing path identifier that is unique in an entire network or in a donor CU.

In a possible design, the destination node is an access IAB node of a terminal device that receives the downlink data packet.

According to a ninth aspect, this application further provides a computer-readable storage medium. The computer-readable storage medium stores a computer program. When the computer program is run on a computer, the computer is enabled to perform the methods according to the seventh aspect and the eighth aspect.

According to a tenth aspect, this application further provides a computer program product including a program. When the computer program product runs on a computer, the computer is enabled to perform the methods according to the seventh aspect and the eighth aspect.

According to an eleventh aspect, this application further provides a communication apparatus, including a processor and a memory, where the memory is configured to store computer-executable instructions, and the processor is configured to execute the computer-executable instructions stored in the memory, so that the communication apparatus performs the methods according to the seventh aspect and the eighth aspect.

According to a twelfth aspect, this application further provides a communication apparatus, including a processor and an interface circuit, where the interface circuit is configured to: receive code instructions and transmit the code instructions to the processor, and the processor runs the code instructions to perform the methods according to the seventh aspect and the eighth aspect.

DESCRIPTION OF EMBODIMENTS

The following describes embodiments of this application with reference to the accompanying drawings.

Figure 1:
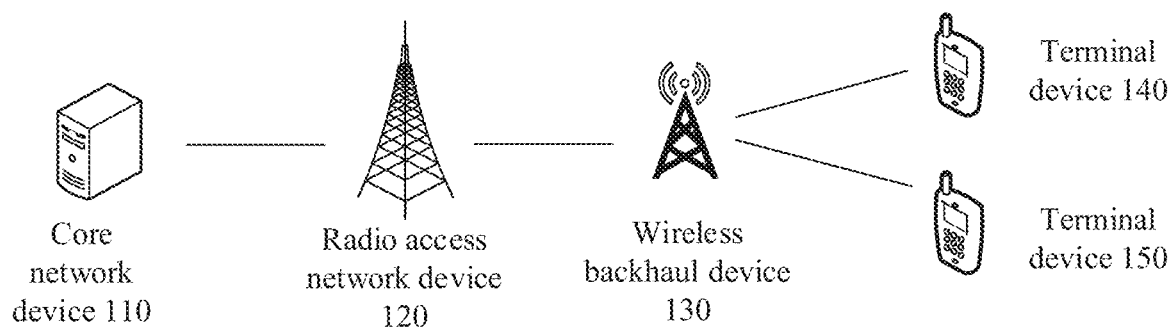
FIG. 1 is a schematic diagram of an architecture of a mobile communication system according to this application.

FIG. 1 is a schematic diagram of an architecture of a mobile communication system to which embodiments of this application are applied. As shown in FIG. 1, the mobile communication system includes a core network device 110, a radio access network device 120, a wireless backhaul device 130, and at least one terminal device (for example, a terminal device 140 and a terminal device 150 in FIG. 1). The terminal device is connected to the wireless backhaul device in a wireless manner, and is connected to the radio access network device through one or more wireless backhaul devices. In addition, some terminal devices may also be directly connected to the radio access network device in a wireless manner. The radio access network device is connected to the core network device in a wireless or wired manner. The core network device and the radio access network device may be independent and different physical devices. Alternatively, a function of the core network device and a logical function of the radio access network device may be integrated into a same physical device. Alternatively, some functions of the core network device and some functions of the radio access network device may be integrated into a physical device. This is not limited in this application. The terminal device may be at a fixed position or may be mobile. It should be understood that the mobile communication system shown in FIG. 1 is merely a schematic diagram, and the communication system may further include another network device, for example, may further include a wireless relay device or a wireless backhaul device, which is not shown in FIG. 1. In addition, quantities of core network devices, radio access network devices, radio backhaul devices, and terminal devices included in the mobile communication system are not limited in the embodiments of this application.

The radio access network device is an access device that is used by the terminal device to access the mobile communication system in a wireless manner. The radio access network device may be a base station NodeB, an evolved base station eNodeB, a base station in a 5G mobile communication system, a base station in a future mobile communication system, an access node in a Wi-Fi system, or the like. This embodiment of this application imposes no limitation on a specific technology used by the radio access network device and a specific device form of the radio access network device. The terminal device may also be referred to as a terminal, UE, a mobile station (MS), a mobile terminal (MT), or the like.

The terminal device may be a mobile phone, a tablet computer (e.g. Pad), a computer having a wireless transceiver function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

The radio access network device and the terminal device may be deployed on land, including an indoor or outdoor device, a handheld device, or a vehicle-mounted device; or may be deployed on water; or may be deployed in an airplane, a balloon, or a satellite in the air. Application scenarios of the radio access network device and the terminal device are not limited in the embodiments of this application.

Communication between the radio access network device and the terminal device and communication between the terminal devices may be performed by using a licensed spectrum, or an unlicensed spectrum, or both a licensed spectrum and an unlicensed spectrum. The communication between the radio access network device and the terminal device and the communication between the terminal devices may be performed by using a spectrum below 6 gigahertz (GHz), or may be performed by using a spectrum above 6 GHz, or may be performed by using both a spectrum below 6 GHz and a spectrum above 6 GHz. Spectrum resources used for the radio access network device and the terminal device are not limited in the embodiments of this application.

The foregoing network elements may be network elements implemented on dedicated hardware, software instances running on the dedicated hardware, or instances of virtualization functions on an appropriate platform. In addition, the embodiments of this application are further applicable to another future-oriented communication technology. The network architecture and the service scenario described in this application are intended to describe the technical solutions in this application more clearly, and do not constitute a limitation on the technical solutions provided in this application. A person of ordinary skill in the art may know that with the evolution of the network architecture and the emergence of new service scenarios, the technical solutions provided in this application are also applicable to similar technical problems.

Due to small coverage of high frequency bands, multi-hop networking may be used in an IAB network to ensure coverage performance of the network. In consideration of service transmission reliability, an IAB node may support dual connectivity (DC) or multi-connectivity, to cope with possible exceptions (such as outage or blockage of a radio link and load fluctuation) on a backhaul link and improve transmission reliability. Therefore, the IAB network may support multi-hop and multi-connectivity networking, and a plurality of routing paths may exist between a terminal device and a donor base station. On a path, there is a specific hierarchical relationship between IAB nodes and between an IAB node and a donor base station serving the IAB node. Specifically, each IAB node treats a node that provides a backhaul service for the IAB node as a parent node, and correspondingly each IAB node can be treated as a child node of a parent node to which the IAB node belongs.

It should be understood that outage or blockage of a radio link may cause a radio link failure or congestion. For example, when a building exists between a UE and an IAB donor, a radio link between the UE and the IAB donor may be blocked. In a conventional technology, causes of a radio link failure mainly include: A physical layer indicates that a problem occurs on a radio link and the problem lasts for duration, a random access failure occurs, or a radio link control (RLC) failure occurs. It should be understood that the radio link failure may also be caused by another reason. This is not limited in this embodiment of this application. Radio link congestion may mean that an amount of buffered uplink or downlink data to be transmitted by an IAB node on a link exceeds a specific threshold.

An IAB node may include a mobile termination (MT) part and a distributed unit (DU) part. From the perspective of a parent node of an IAB node, the IAB node may be considered as a terminal device that accesses the parent node, that is, the IAB node plays a role of an MT. From the perspective of a child node of an IAB node, the IAB node may be considered as a network device that provides a backhaul service for the child node, that is, the IAB node plays a role of a DU. The child node herein may be another IAB node or a terminal device.

An IAB donor may be an access network element, for example, a donor base station DgNB, that has comprehensive base station functions, or may be an access network element in a form in which a centralized unit (CU) and a distributed unit (DU) are separated. The TAB donor is connected to a core network (for example, a 5G core network) element that serves the terminal device and provides a wireless backhaul function for the IAB node. For ease of description, the centralized unit of the IAB donor is referred to as a donor CU, and the distributed unit of the IAB donor is referred to as a donor DU. The donor CU may also be in a form in which a control plane (CP) and a user plane (UP) are separated. For example, the CU may include one CU-CP and one (or more) CU-UPs.

In this embodiment of this application, an access IAB node is an IAB node accessed by the terminal device, that is, an IAB node that provides a service for the terminal device. In an IAB uplink transmission process, the access IAB node transmits, through one or more other IAB nodes, an uplink data packet sent by the terminal device to a destination donor DU, and then the destination donor DU transmits the uplink data packet to a corresponding donor CU-UP. In an IAB downlink transmission process, if a data packet is to be sent to the terminal device, a donor CU-UP transmits a downlink data packet that is to be sent to the terminal device to a corresponding donor DU, the donor DU transmits the downlink data packet to an access IAB node corresponding to the terminal device through one or more other IAB nodes or through a direct backhaul link, and the access IAB node then transmits the received downlink data packet to the terminal device. If a data packet is to be sent to an IAB node, a donor CU-UP transmits a downlink data packet that is to be sent to the IAB node to a corresponding donor DU, the donor DU transmits the downlink data packet to a parent node of the IAB node through one or more other IAB nodes or through a direct backhaul link, and the parent node of the IAB node then transmits the received downlink data packet to the IAB node.

It should be understood that, in an IAB downlink transmission process, if a node (referred to as a terminating node) at which a data packet finally arrives is a terminal device, a destination node is an access IAB node corresponding to the terminal device. If the terminating node is an IAB node, the destination node is a parent node of the IAB node. In an IAB uplink transmission process, the terminating node is a donor CU-UP, and the destination node is a donor DU corresponding to the donor CU-UP. The destination node may also be referred to as a destination receiving node.

Therefore, in this embodiment of this application, if the data packet is an uplink data packet, the destination node is a donor DU, the first node is an access IAB node, or an intermediate IAB node between an access IAB node and an IAB donor (referred to as an intermediate IAB node), and the source node is an access IAB node. The access IAB node herein is an IAB node accessed by a terminal device that sends the uplink data packet. If the data packet is a downlink data packet to be sent to a terminal device, the destination node is an access IAB node, the first node is a donor DU or an intermediate IAB node, and the source node is a donor DU. The access IAB node herein is a node accessed by a terminal device that receives the downlink data packet. Alternatively, if the data packet is a downlink data packet to be sent to an IAB node, the destination node is a parent node of the IAB node, and the first node is a donor DU or an intermediate IAB node.

Figure 2:
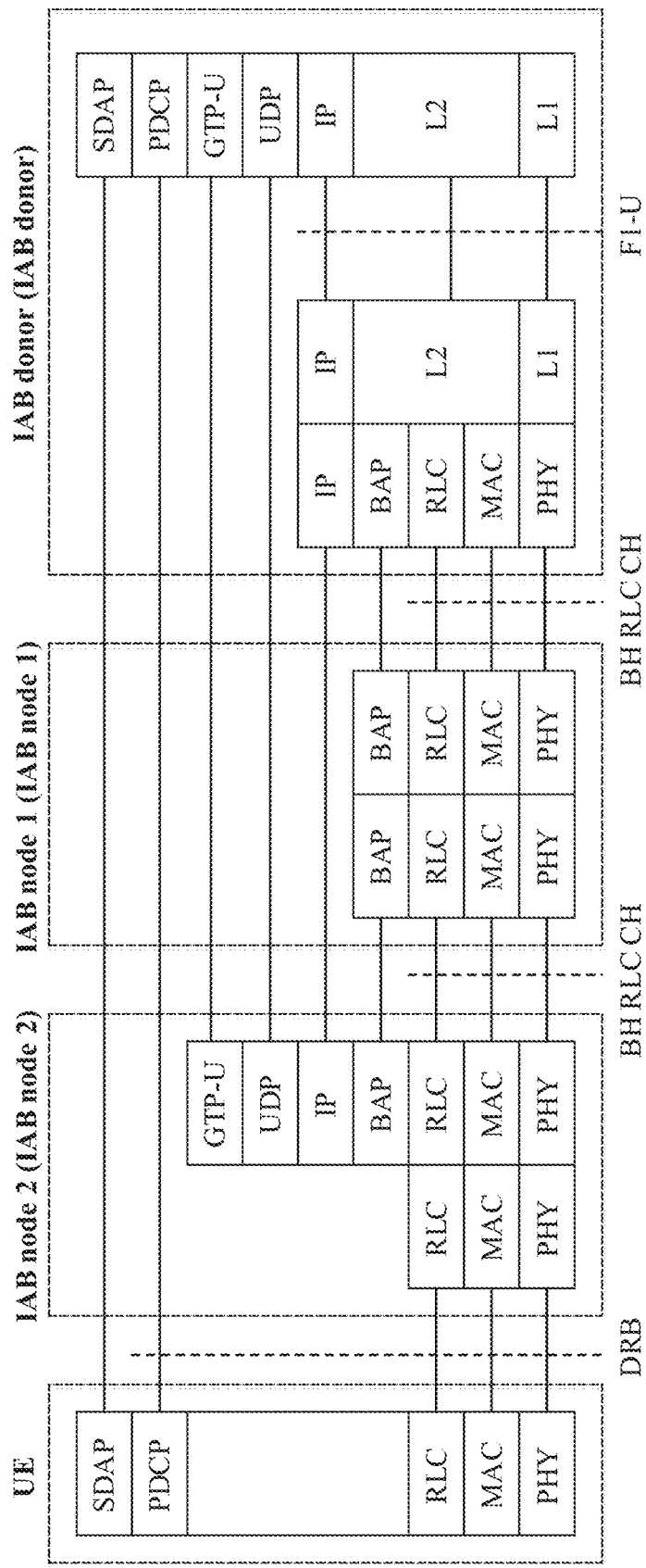
FIG. 2 is a schematic diagram of a protocol architecture according to this application.

The Backhaul Adaptation Protocol (BAP) is a protocol layer newly introduced in an IAB network. Main functions of BAP are to complete routing and bearer mapping in the IAB network. A possible protocol architecture is shown in FIG. 2. A BAP layer exists on a DU side of an IAB donor, an intermediate IAB node, and an MT side of an access IAB node, and the BAP layer is located above an RLC protocol layer. In addition, an MT and a DU of the intermediate IAB node (for example, IAB node 1 in FIG. 2) may share one backhaul adaptation protocol entity, or the MT and the DU may each have one backhaul adaptation protocol entity.

Figure 3:
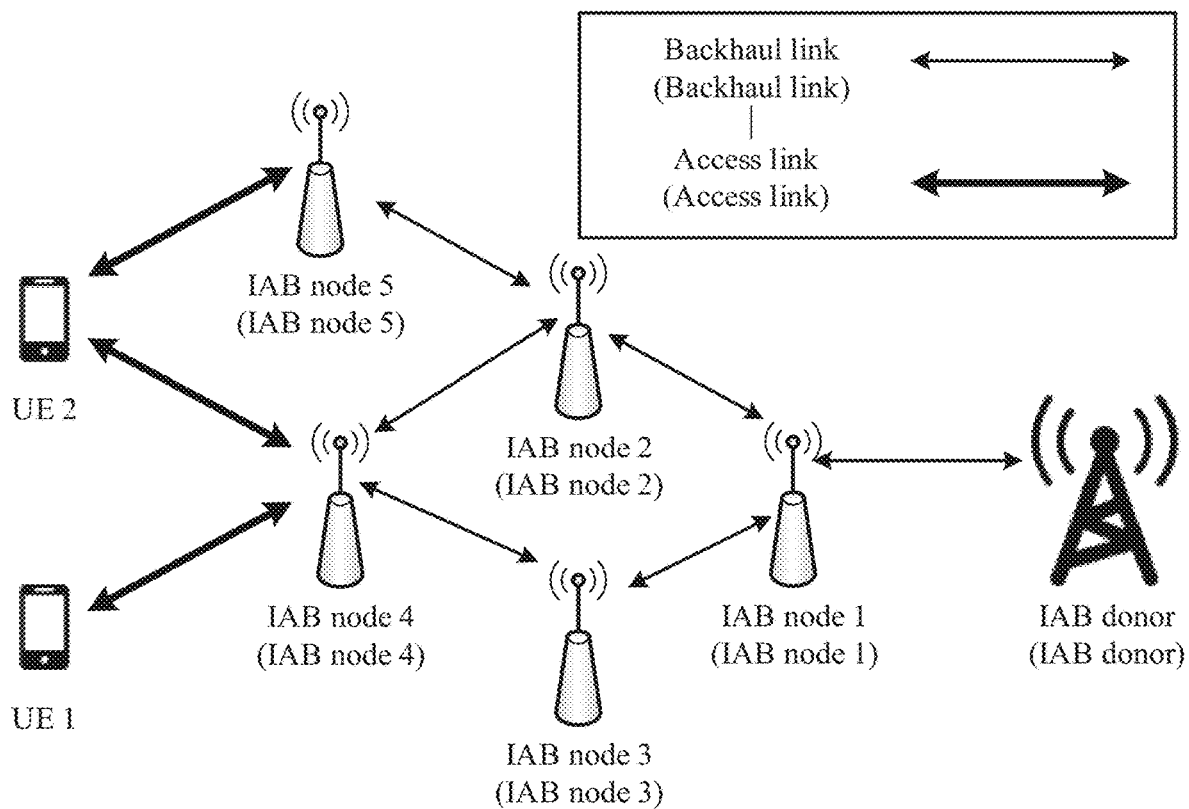
FIG. 3 is a schematic diagram of an IAB networking scenario according to this application.

FIG. 3 is a schematic diagram of an IAB networking scenario. A parent node of IAB node 1 is DgNB, IAB node 1 is a parent node of IAB node 2 and IAB node 3, both IAB node 2 and IAB node 3 are parent nodes of IAB node 4, and a parent node of IAB node 5 is IAB node 3. An uplink data packet sent by UE 1 may be transmitted to the DgNB through one or more IAB nodes, and then the DgNB sends the uplink data packet to a mobile gateway device (for example, a user plane function unit in a 5G core network). After receiving a downlink data packet from the mobile gateway device, the DgNB sends the downlink data packet to UE 1 through one or more IAB nodes. Similarly, the foregoing descriptions also apply to UE 2.

There are two available paths for data packet transmission between UE 1 and the DgNB. To be specific, path 1 is UE 1→IAB node 4→IAB node 3→IAB node 1→DgNB; and path 2 is UE 1→IAB node 4→IAB node 2→IAB node 1→DgNB.

IAB node 4 is an access IAB node of UE 1, IAB node 3 and IAB node 1 are intermediate IAB nodes on path 1, and IAB node 2 and IAB node 1 are intermediate IAB nodes on path 2. The DgNB is a destination node.

There are three available paths for data transmission between UE 2 and the DgNB. To be specific, path 3 is UE 2→IAB node 4→IAB node 3→IAB node 1→DgNB, path 4 is UE 2→IAB node 4→IAB node 2→IAB node 1→DgNB, and path 5 is UE 2→IAB node 5→IAB node 2→IAB node 1→DgNB.

On path 3, IAB node 4 is an access IAB node of UE 1, and IAB node 3 and IAB node 1 are intermediate IAB nodes. On path 4, IAB node 4 is an access IAB node of UE 1, and IAB node 2 and IAB node 1 are intermediate IAB nodes. On path 5, IAB node 5 is an access IAB node of UE 1, and IAB node 2 and IAB node 1 are intermediate IAB nodes. The DgNB is a destination node.

It should be understood that the IAB networking scenario shown in FIG. 3 is merely an example. More other possibilities in an IAB network that supports multi-hop and multi-connectivity networking exist and are not listed herein one by one.

Based on this, to implement routing of a data packet by an IAB node, this application provides the following embodiments.

Embodiment 1

This application provides a method for determining a destination node identifier of a data packet. The method may be used for a first node to determine a BAP address of a destination node of a received data packet. The method includes but is not limited to the following several possible designs:

In a possible design, if the data packet is an uplink data packet, the first node uses a BAP address of a destination node configured by a donor CU for the first node as the destination node of the data packet received by the first node, where the BAP address of the destination node of the uplink data packet is configured by the donor CU for the first node.

In another possible design, if the data packet is an uplink data packet, the first node determines the BAP address of the destination node based on a mapping relationship between a destination CU-CP and the BAP address of the destination node. A mapping relationship between the destination CU-CP and a destination node identifier is configured by the donor CU.

For example, if the data packet is an uplink data packet, the first node determines the BAP address of the destination node based on a mapping relationship between an IP address of the destination CU-UP and the BAP address of the destination node. The mapping relationship between the IP address of the destination CU-UP and the destination node identifier is configured by the donor CU.

In still another possible design, if the data packet is an uplink data packet or a downlink data packet, the first node determines the BAP address of the destination node based on a field carried in the data packet, such as a UE identifier, a UE bearer identifier, a tunnel endpoint identifier in a GPRS Tunneling Protocol User Plane (GTP-U), or a differentiated services code point (DSCP), a flow label, or a traffic class in an IP header, and a mapping relationship between any one of the foregoing identifiers and the BAP address of the destination node. The mapping relationship between any one of the foregoing identifiers and the BAP address of the destination node is configured by the donor CU for the first node.

In still another possible design, if the data packet is a downlink data packet, the first node determines the BAP address of the destination node based on a mapping relationship between an IP address of the destination node and the BAP address of the destination node. When the downlink data packet is sent to a terminal device, the IP address of the destination node is an IP address of an IAB node accessed by the terminal device. When the downlink data packet is sent to an IAB node, the IP address of the destination node is an IP address of a parent node of the IAB node. The mapping relationship between the IP address of the destination node and the BAP address of the destination node is configured by the donor CU for the first node. In an example, if the data packet is a downlink data packet, the first node determines the BAP address of the destination node based on an IP address of the destination node carried in the downlink data packet and a stored mapping relationship between the IP address of the destination node and the BAP address of the destination node. Optionally, if the data packet is an uplink data packet, the BAP address of the destination node is a BAP ID of the donor DU. If the data packet is a downlink data packet, the BAP address of the destination node is a BAP ID of an access IAB node of a terminal device that receives the downlink data packet or a BAP ID of a parent node of an IAB node that receives the downlink data packet. It should be understood that the BAP address of the destination node herein may also be replaced with the following identifier: a DU ID allocated by the donor CU to each IAB node, an MT ID allocated by the donor CU to each IAB node, an evolved universal mobile telecommunication system terrestrial radio access network cell global identifier (ECGI), a new radio cell global identifier (NCGI), an IP address of an IAB node, an IP address of an IAB DU, or an IP address of an IAB MT.

In the foregoing several designs, the first node determines the BAP address of the destination node, so as to enable routing of the data packet. Further, different BAP addresses of destination nodes can be configured for data packets with different service requirements or data packets with different terminating nodes. In this way, data packet offloading in an IAB network can be implemented.

Embodiment 2

This application further provides a method for an IAB node to re-determine a destination node identifier of a data packet. The method may be used for a first node to re-determine a BAP address of a destination node of a received data packet. It should be understood that Embodiment 2 may be used alone or in combination with Embodiment 1.

The method includes but is not limited to the following several possible designs:

In a possible design, a donor CU configures an identifier of one second node or identifiers of a plurality of second nodes for a first node. When the first node determines that a radio link of a routing path for sending a data packet to a destination node fails or is congested, and the first node is configured with an identifier of one second node or identifiers of a plurality of second nodes, the first node uses the identifier of the one second node or one of the identifiers of the plurality of second nodes as a BAP address of the destination node and performs routing.

In another possible design, a data packet received by the first node includes the BAP address of the destination node, and optionally, the data packet further includes an identifier of one second node or identifiers of a plurality of second nodes. When the first node determines that a radio link of a routing path for sending a data packet to the destination node fails or is congested, and the received data packet includes an identifier of one second node or identifiers of a plurality of second nodes, the first node uses the identifier of the one second node or one of the identifiers of the plurality of second nodes as the BAP address of the destination node and performs routing. Optionally, the first node may alternatively replace the BAP address of the destination node carried in a BAP header in the received data packet with the identifier of the second node, or the first node uses the identifier of the second node as the BAP address of the destination node when generating a BAP header.

For the foregoing two possible designs, the second node may be understood as a backup destination node of the destination node. The second node herein may also be referred to as a second destination node. Before the first node determines that the radio link of the routing path for sending the data packet to the destination node fails or is congested, the destination node determined by the first node may also be referred to as a first destination node. If the data packet is an uplink data packet, the second node is another distributed unit of an IAB donor to which the destination node before the change belongs. If the data packet is a downlink data packet, the second node is another IAB node accessed by a terminal device that receives the data packet or another parent node of an IAB node that receives the data packet.

It should be understood that, that the radio link of the routing path for sending the data packet to the destination node fails or is congested means that a radio link failure or congestion occurs on any one or more hops on a one-hop or multi-hop radio backhaul link between the first node and the destination node. A specific solution for the first node to obtain a radio link failure or congestion on the routing path for sending the data packet to the destination node may not be limited in this embodiment.

It should be understood that, when the first node determines that the radio link of the routing path for sending the data packet to the destination node fails or is congested, the BAP address of the destination node may not need to be modified. For example, if the first node determines that there are a plurality of routing paths between the first node and the destination node, and the first node determines that a radio link failure or congestion occurs on a currently selected routing path between the first node and the destination node, the first node may select other routing paths than the routing path between the first node and the destination node. In this case, the first node does not need to perform routing through a second node. Alternatively, the first node may choose to wait for the radio link to recover. In this case, the first node also does not need to perform routing through a second node.

Figure 4:
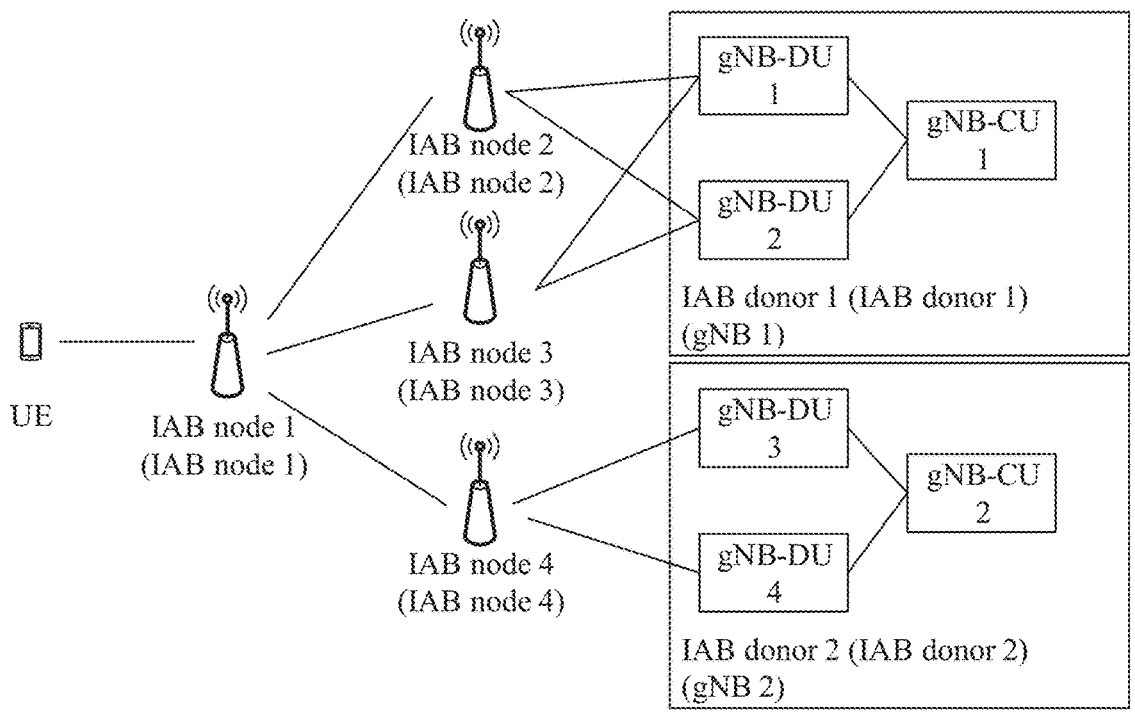
FIG. 4 is a schematic diagram showing that a first node performs routing through a second node according to this application.

For example, if the data packet is an uplink data packet, as shown in FIG. 4, IAB node 1 may obtain next-hop node (IAB node 2) information by querying a routing table and determine that a radio link failure (RLF) or congestion occurs on an uplink backhaul link between IAB node 1 and IAB node 2. If other (one or more) routing paths (a path passing through IAB node 3 shown in FIG. 4) that can reach a same destination node gNB-DU 1 exist in the routing table, IAB node 1 does not need to modify the BAP address of the destination node. If no other routing path that can reach a same destination node gNB-DU 1 exists in the routing table, but gNB-DU 2 and gNB-DU 1 belong to a same IAB donor (or IAB donor CU-UP), LAB node 1 determines that gNB-DU 2 is a new destination node, and uses an identifier of gNB-DU 2 as the BAP address of the destination node. That gNB-DU 2 and gNB-DU 1 belong to a same IAB donor (or IAB donor CU-UP) may be configured by the IAB donor for IAB node 1. Alternatively, the IAB donor may directly configure BAP addresses of one or more alternative destination nodes for a BAP address of each destination node (for example, a BAP address of an alternative destination node configured by the IAB donor for an identifier of gNB-DU 1 is the identifier of gNB-DU 2). If no other routing path that can reach a same destination receiving node gNB-DU 1 exists in the routing table, and no node that belongs to a same IAB donor (or IAB donor CU-UP) as gNB-DU 1 exists, IAB node 1 does not modify the BAP address of the destination node and waits for the radio link to recover.

With the method provided in the foregoing embodiment, when the first node determines that the radio link of the routing path for sending the data packet to the destination node fails or is congested, the first node may re-determine a BAP address of a destination node of the data packet and perform routing based on the BAP address of the new destination node. In this way, the data packet can be sent to the new destination node in time without waiting for the radio link to recover, thereby better meeting a service latency requirement.

Embodiment 3

This application provides a method for determining a routing path of a data packet. The method may be used for a first node to determine a routing path of a data packet. It should be understood that Embodiment 3 may be used alone or in combination with at least one of Embodiment 1 and Embodiment 2.

There may be a plurality of routing paths between a first node and a destination node, and a routing path of a data packet is a first path between the first node and the destination node. The first node may determine the first path in but not limited to the following manners:

Manner 1: The first path is a first default routing path between the first node and the destination node.

The first default routing path between the first node and the destination node may be configured by a donor CU for the first node. The donor CU may specify a routing path as the first default routing path for the first node.

Manner 2: The first path is a routing path with a highest priority in at least one routing path between the first node and the destination node in a routing table of the first node. Routing table information of the first node is configured by the donor CU for the first node.

For example, the routing table of the first node includes priority information of one or more routing paths between the first node and the destination node. If a routing path with a highest priority exists, the routing path is the first path.

Manner 3: The first path is a routing path determined by the first node from a plurality of routing paths between the first node and the destination node based on a preset relationship between a data volume buffered by the first node and a preset threshold.

For example, if the buffered data amount is less than or equal to the preset threshold, the first node may select a routing path with a highest priority in the routing paths between the first node and the destination node as the first path. If the buffered data amount is greater than the preset threshold, the first node may select a routing path with a second highest priority in the routing paths between the first node and the destination node as the first path. It should be understood that the foregoing description is merely an example and is not used as a limitation in this application. The first node may alternatively select another routing path.

Manner 4: The first path is a routing path determined by the first node from a plurality of routing paths between the first node and the destination node based on preset ratio information, where the preset ratio information is ratio information of a quantity of transmitted data packets corresponding to each of the plurality of routing paths.

For example, the donor CU configures preset ratio information for the plurality of routing paths between the first node and the destination node. The first node transmits data packets through the plurality of routing paths based on the preset ratio information. For example, there are three routing paths between the first node and the destination node: path 1, path 2, and path 3. The preset ratio information is as follows: a quantity of data packets transmitted through path 1: a quantity of data packets transmitted through path 2: a quantity of data packets transmitted through path 3 is 2:3:5. Therefore, the first node transmits the data packets through path 1, path 2, and path 3 based on the preset ratio information.

Manner 5: The first path is a routing path determined by the first node based on indication information carried in the data packet.

For example, if the data packet is a downlink data packet or an uplink data packet, the first node determines the first path based on a field carried in the data packet, such as a UE identifier, a UE bearer identifier, a tunnel endpoint identifier in a GTP-U, or a DSCP, a flow label, or a traffic class in an IP header. A relationship between the foregoing field and the first path may be configured by a CU-CP or predefined in a protocol.

Optionally, a routing path identifier of the first path may include ID information of all IAB nodes on the first path; or a routing path identifier of the first path may be in a form of an index, and the donor CU needs to configure an association relationship between the index and the routing path. N path identifiers correspond to N routing paths between a same access IAB node and a same destination node. Routing paths between different access IAB nodes and different destination nodes may reuse a same routing path identifier. Alternatively, each routing path has a routing path identifier that is unique in an entire network or in a CU.

For example, for routing paths between IAB node 4 and the DgNB in FIG. 3, an association relationship between an index and a routing path is as follows: Path 1 corresponds to IAB node 4→IAB node 3→IAB node 1→DgNB, path 2 corresponds to IAB node 4→IAB node 2→IAB node 1→DgNB, path 3 corresponds to IAB node 4→IAB node 3→IAB node 1→DgNB, and path 4 corresponds to IAB node 4→IAB node 2→IAB node 1→DgNB. For a routing path between IAB node 5 and the DgNB, an association relationship between an index and a routing path is as follows: Path 1 corresponds to IAB node 5→IAB node 2→IAB node 1→DgNB.

For another example, each routing path in FIG. 3 may correspond to a globally unique path identifier. An association relationship between an index and a routing path is as follows: Path 1 corresponds to IAB node 4→IAB node 3→IAB node 1→DgNB, path 2 corresponds to IAB node 4→IAB node 2→IAB node 1→DgNB, path 3 corresponds to IAB node 4→IAB node 3→IAB node 1→DgNB, path 4 corresponds to IAB node 4→IAB node 2→IAB node 1→DgNB, and path 5 corresponds to IAB node 5→IAB node 2→IAB node 1→DgNB.

Optionally, if a duplication function is configured on the first node for an uplink data packet or a downlink data packet, the first node needs to determine a first path and a third path for two duplicated data packets respectively. The first path is a routing path of one data packet in the two duplicated data packets. A determining method is the same as the method described in the foregoing embodiment, and details are not described herein again. The third path is a routing path of another data packet in the two duplicated data packets. The first node may determine the third path in but not limited to the following manners:

Manner 1: The third path is a second default routing path between the first node and the destination node.

The second default routing path between the first node and the destination node may be configured by the donor CU for the first node. The donor CU may specify a routing path as a default path for the first node. Optionally, the second default routing path and the first default routing path may be configured at the same time.

Manner 2: The third path is a routing path with a third highest priority in the routing paths between the first node and the destination node in the routing table of the first node. Routing table information of the first node is configured by the donor CU for the first node.

For example, the routing table of the first node includes priority information of one or more routing paths between the first node and the destination node. If a routing path with a third highest priority exists, the routing path is the third path.

With the foregoing embodiment, the first node may determine a routing path between the first node and the destination node, and send the data packet to the destination node based on the routing path between the first node and the destination node, so that data packet offloading in an IAB network can be implemented.

Embodiment 4

This application provides a method for re-determining a routing path of a data packet. The method may be used for a first node to re-determine a routing path of a data packet. It should be understood that Embodiment 4 may be used alone or in combination with at least one of Embodiment 1, Embodiment 2, and Embodiment 3.

In some possible scenarios (for example, a radio link failure or congestion), a routing path of a data packet is unavailable. In this case, a first node needs to determine a new routing path between the first node and a destination node as the routing path of the data packet.

For example, a routing table of the first node may include a plurality of routing paths between the first node and the destination node, and the current routing path of the data packet may be a routing path with a highest priority in the plurality of routing paths between the first node and the destination node. When the first node determines that the routing path with the highest priority is unavailable, the first node may select a routing path with a second highest priority as the routing path of the data packet.

For example, the routing table of the first node may include a plurality of routing paths between the first node and the destination node. If the first node determines that the current routing path of the data packet is unavailable, a routing path other than the current routing path of the data packet may be randomly selected from the plurality of routing paths between the first nodes and the destination node as the routing path of the data packet.

It should be understood that, when the first node determines that the current routing path of the data packet is unavailable, the first node may re-determine a routing path of the data packet in but not limited to the foregoing manners. This is merely an example herein, and is not limited to this application.

With the foregoing embodiment, when the first node determines that the routing path of the data packet is unavailable, the first node may re-determine a new routing path between the first node and the destination node as the routing path of the data packet. In this way, the data packet can be sent to the destination node in time through another routing path without waiting the radio link to recover, thereby better meeting a service latency requirement.

Embodiment 5

This application provides a method for designing a BAP header format. It should be understood that Embodiment 5 may be used alone or in combination with at least one of Embodiment 1, Embodiment 2, Embodiment 3, and Embodiment 4.

A BAP header includes a BAP address of a destination node of a data packet and first information. The first information is used to determine whether the BAP header includes a routing path identifier of the data packet.

The first information in the BAP header may include but is not limited to the following two possible designs:

In a possible design, the first information is the routing path identifier of the data packet. If the routing path identifier of the data packet is a first value, the routing path identifier of the data packet is disabled. In other words, when the routing path identifier read by a node that receives the data packet is the first value, the routing path identifier can be ignored. The foregoing design can ensure that the BAP header has a unified format and the length of the BAP header remains unchanged regardless whether there is a routing path identifier of the data packet.

Figure 5A:
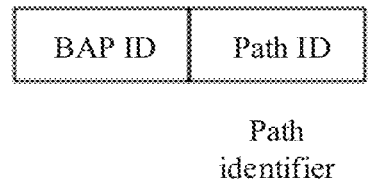
FIG. 5A and FIG. 5B are schematic diagrams of formats of a BAP header according to this application.

For example, as shown in FIG. 5A, a BAP header includes a BAP address of a destination node (a BAP ID of the destination node in FIG. 5A) and a routing path identifier of a data packet. If the routing path identifier of the data packet is a first value, the routing path identifier of the data packet is disabled, indicating that the BAP header does not include the routing path identifier of the data packet.

In another possible design, the first information includes an indication field. The indication field is used to indicate whether the BAP header includes the routing path identifier of the data packet. If the indication field indicates that the BAP header includes the routing path identifier of the data packet, the first information further includes the routing path identifier of the data packet. The foregoing design can reduce header overheads when the BAP header does not include the routing path identifier of the data packet.

Figure 5B:
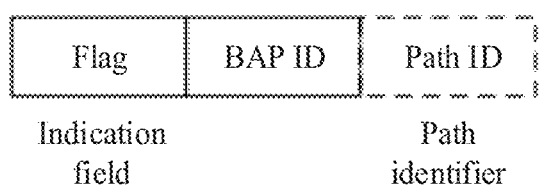

For example, as shown in FIG. 5B, a BAP header includes a 1-bit indication field and a BAP address of a destination node (a BAP ID of the destination node in FIG. 5B). If the indication field indicates "1", the BAP header further includes a routing path identifier of a data packet. If the indication field indicates "0", the BAP header does not include the routing path identifier of the data packet.

Optionally, the BAP address of the destination node included in the BAP header may be a BAP ID or a BAP address of the destination node; or optionally, the BAP header may further include a BAP address of a source node, for example, a BAP address of the source node.

Optionally, the routing path identifier included in the BAP header may be a unique routing path identifier for the destination node. Alternatively, the routing path identifier included in the BAP header may be a unique routing path identifier for the source node and the destination node. In this case, the BAP header further includes the BAP address of the source node, for example, a BAP ID or a BAP address of the source node.

For example, in an IAB network, IAB node A may be a destination node of N routing paths, where the N routing paths are routing paths between IAB node A and a plurality of donor DUs. There are M routing paths between IAB node A and one of the donor DUs, where M is less than or equal to N, and M and N are positive integers. If the data packet is a downlink data packet, a routing path identifier included in the BAP header may be a unique routing path identifier that uses IAB node A as the destination node, or a unique routing path identifier that uses IAB node A as the destination node and one of the donor DUs as the source node.

Optionally, the BAP header further includes a length indication of a routing path identifier field. A field corresponding to a routing path identifier included in the BAP header may vary with IAB nodes. In addition, a length of the field corresponding to the routing path identifier depends on a quantity of routing paths or whether the routing path identifier includes the BAP ID or the BAP address of the source node.

For example, in an IAB network, IAB node A may be a destination node of N routing paths, where the N routing paths are routing paths between IAB node A and a plurality of donor DUs. There are M routing paths between IAB node A and one of the donor DUs, where M is less than or equal to N, and M and N are positive integers. If the data packet is a downlink data packet, lengths of routing path identifier fields in BAP headers are different in the following two cases. Therefore, the BAP header may further include the length indication of the routing path identifier field.

Case 1: The routing path identifier included in the BAP header is a unique routing path identifier that uses IAB node A as the destination node.

Case 2: The routing path identifier included in the BAP header is a unique routing path identifier that uses IAB node A as the destination node and one of the donor DUs as the source node.

For another example, in the IAB network, IAB node A may be a destination node of N routing paths, and IAB node B may be a destination node of K routing paths, where K is not equal to N, and K and N are positive integers. If the data packet is a downlink data packet, lengths of routing path identifier fields in BAP headers are different in the following two cases. Therefore, the BAP header may further include the length indication of the routing path identifier field.

Case 1: The routing path identifier included in the BAP header is a unique routing path identifier that uses IAB node A as the destination node.

Case 2: The routing path identifier included in the BAP header is a unique routing path identifier that uses IAB node B as the destination node.

Optionally, the BAP header further includes the length indication of a field of the BAP address of the destination node. A field corresponding to the BAP address of the destination node included in the BAP header may vary with IAB nodes or may vary with uplink and downlink transmission directions. For example, for a downlink data packet, a BAP address of a destination node corresponding to the downlink data packet is a BAP address of an IAB node accessed by a terminal device. BAP addresses of destination nodes of all uplink data packets are BAP addresses of donor DUs. Generally, a quantity of IAB nodes is much greater than a quantity of donor DUs. Alternatively, the BAP header further includes an uplink/downlink indication of the data packet. A length of the field of the BAP address of the destination node is implicitly determined by uplink/downlink indication information.

It should be understood that whether the donor DU or each IAB node includes the routing path identifier of the data packet or the BAP address of the source node in the BAP header may be determined by configurations. The configurations may be carried in an RRC message (used to configure an MT part of an IAB node) or an F1-AP message (used to configure a donor DU or a DU part of an IAB node) sent by a donor CU-CP.

Figure 6:
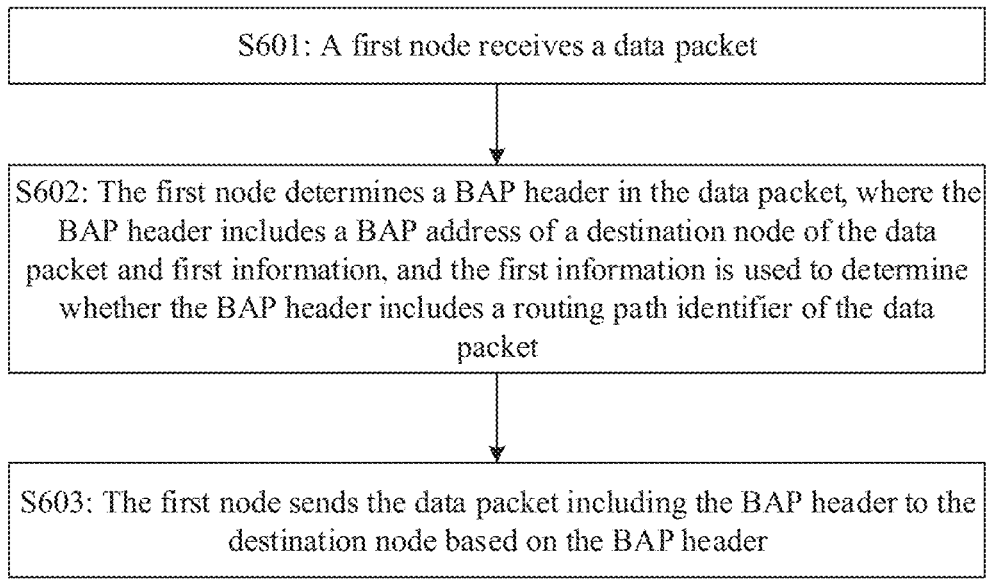
FIG. 6 is an overview flowchart of a routing method according to this application.

Refer to FIG. 6. An embodiment of this application provides a routing method. The method includes the following steps.

S601: A first node receives a data packet.

For example, if the data packet is an uplink data packet and the first node is an access IAB node of a terminal device that sends the uplink data packet, the first node receives the uplink data packet from the terminal device. If the data packet is a downlink data packet and the first node is a donor CU, the first node receives the downlink data packet from a CU-UP. If the data packet is an uplink data packet and the first node is an intermediate IAB node, the first node receives the data packet from a previous-hop IAB node, where the previous-hop IAB node herein is a child node of the first node. If the data packet is a downlink data packet and the first node is an intermediate IAB node, the first node receives the data packet from a previous-hop IAB node, where the previous-hop IAB node herein is a parent node of the first node.

S602: The first node determines a BAP header in the data packet and a next-hop node.

The BAP header includes a BAP address of a destination node of the data packet and first information. The first information is used to determine whether the BAP header includes a routing path identifier of the data packet.

That the first node determines the BAP header in the data packet includes the following cases:

Case 1: The first node adds a BAP header to the data packet.

In an example, if the data packet is an uplink data packet and the first node is an access IAB node of a terminal device that sends the uplink data packet, the first node adds a BAP header to the data packet.

In another example, if the data packet is a downlink data packet and the first node is a donor CU, the first node adds a BAP header to the data packet.

In a possible design, if the first node is an intermediate IAB node, the first node removes the BAP header from the data packet and then adds the BAP header again to the data packet.

For example, header addition and header removal may be completed by two BAP entities, and further require inter-layer exchange of a BAP ID and/or a path ID (that is, the routing path identifier of the data packet). For example, for a downlink data packet, when a BAP of an MT of an IAB node receives the data packet from a parent node, the BAP header is first removed: and when the MT of the IAB node sends the data packet to a DU of the IAB node and the data packet arrives at a BAP layer of the DU, the BAP header is added again at the BAP layer of the DU.

Case 2: The first node modifies the BAP header in the data packet.

It should be understood that case 2 is generally for a scenario in which the first node is an intermediate IAB. If the BAP header includes the BAP address of the destination node and the routing path identifier of the data packet, the intermediate IAB node may determine the BAP address of the destination node and a routing path of the data packet by using the methods provided in Embodiments 1 to 4. If the determined BAP address of the destination node and the routing path of the data packet are the same as the BAP address of the destination node and the routing path of the data packet in the current BAP header, the intermediate IAB node does not need to modify the BAP header of the data packet. Similarly, if the BAP header includes the BAP address of the destination node but does not include the routing path identifier of the data packet, the intermediate IAB node may determine the BAP address of the destination node by using the method provided in Embodiment 1. If the determined BAP address of the destination node is the same as the BAP address of the destination node in the current BAP header, the intermediate IAB node does not need to modify the BAP header of the data packet. Alternatively, if the intermediate IAB node determines that a radio link of the routing path of the packet fails or is congested, the intermediate IAB node may need to re-determine a new destination node and use a BAP address of the new destination node as the BAP address of the destination node, and may need to re-determine a new routing path of the data packet. For details, refer to Embodiments 1 to 4.

Particularly, if the BAP header includes the routing path identifier of the data packet, the first node may choose to modify the BAP header by using the determined new routing path of the data packet, change the routing path identifier of the data packet in the first information to the first value, or modify an indication field in the first information to indicate that the BAP header does not include the routing path identifier of the data packet.

Case 3: The first node continues to use the BAP header.

In an example, regardless of an uplink data packet or a downlink data packet, if the first node is an intermediate IAB node, a data packet received by the first node from a previous-hop node includes a BAP header, and the first node continues to use the BAP header when transmitting the data packet to a next-hop node.

The first node determines a next-hop node of the first node on a routing path of the data packet based on the BAP header in the data packet and a common field in the BAP header and a routing table. That the first node determines a next-hop node includes but is not limited to the following scenarios:

Scenario 1: The BAP header includes the BAP address of the destination node and the routing path identifier of the data packet, or the first node has determined the BAP address of the destination node and the routing path identifier of the data packet according to Embodiments 1 to 4.

If the routing table of the first node includes the BAP address of the destination node, a next-hop node corresponding to the destination node, and a routing path identifier corresponding to the destination node, the first node may uniquely determine one next-hop node based on the BAP address of the destination node and the routing path identifier of the data packet.

If the routing table of the first node includes the BAP address of the destination node and a next-hop node corresponding to the destination node, but does not include a routing path identifier corresponding to the destination node, the following two cases exist: If the destination node corresponds to only one next-hop node, the first node may uniquely determine one next-hop node; and if the destination node corresponds to a plurality of next-hop nodes, the first node needs to perform a selection operation, that is, select one next-hop node from the plurality of next-hop nodes. A specific selection operation may not be limited. For example, the first node may select a next-hop node with a highest priority based on a priority parameter corresponding to each next-hop node. The donor CU may configure a priority parameter for each next-hop node of the first node. It is assumed that a quantity of next-hop nodes is N. A priority parameter of the $i^{th}$ next-hop node in the N next-hop nodes is used to indicate a priority of the $i^{th}$ next-hop node in the N next-hop nodes.

Optionally, if the BAP header includes the BAP address of the destination node and the routing path identifier of the data packet, but the routing path identifier corresponding to the BAP address of the destination node is not found in the routing table, the first node may remove the routing path identifier from the BAP header or set the routing path identifier in the BAP header to the first value for disabling the routing path identifier.

Scenario 2: The BAP header includes the BAP address of the destination node but does not include the routing path identifier of the data packet, or the first node has determined the BAP address of the destination node according to Embodiments 1 and 2.

The routing table of the first node includes the BAP address of the destination node and a next-hop node corresponding to the destination node. If the destination node corresponds to only one next-hop node, the first node may uniquely determine one next-hop node; and if the destination node corresponds to a plurality of next-hop nodes, the first node needs to perform a selection operation, that is, select one next-hop node from the plurality of next-hop nodes. A specific selection operation may not be limited. For example, the first node may select a next-hop node with a highest priority based on a priority parameter corresponding to each next-hop node.

Scenario 3: The first node has determined the BAP address of the destination node and the routing path identifier of the data packet according to Embodiments 1 to 4.

If the routing table of the first node includes the BAP address of the destination node, a next-hop node corresponding to the destination node, and a routing path identifier corresponding to the destination node, the first node may uniquely determine one next-hop node based on the determined BAP address of the destination node and the routing path identifier of the data packet.

If the routing table of the first node includes the BAP address of the destination node and a next-hop node corresponding to the destination node, but does not include a routing path identifier corresponding to the destination node, the following two cases exist: If the destination node corresponds to only one next-hop node, the first node may uniquely determine one next-hop node; and if the destination node corresponds to a plurality of next-hop nodes, the first node needs to perform a selection operation, that is, select one next-hop node from the plurality of next-hop nodes. A specific selection operation may not be limited. For example, the first node may select a next-hop node with a highest priority based on a priority parameter corresponding to each next-hop node.

Scenario 4: The first node has determined the BAP address of the destination node according to Embodiments 1 and 2. The routing table of the first node includes the BAP address of the destination node and a next-hop node corresponding to the destination node. If the destination node corresponds to only one next-hop node, the first node may uniquely determine one next-hop node; and if the destination node corresponds to a plurality of next-hop nodes, the first node needs to perform a selection operation, that is, select one next-hop node from the plurality of next-hop nodes. A specific selection operation may not be limited. For example, the first node may select a next-hop node with a highest priority based on a priority parameter corresponding to each next-hop node.

Scenario 5: If the routing table of the first node is not configured, the routing table of the first node does not include a next-hop node corresponding to the destination node, or the BAP header does not include the BAP address of the destination node, and the first node has only one next-hop node, the first node directly routes the data packet to the unique next-hop node.

It should be understood that, the foregoing scenario 1 to scenario 5 are merely examples, and are not limited in this application. In addition, an order in which the first node determines the BAP header in the data packet and the next-hop node is not limited in this application.

S603: The first node sends the data packet including the BAP header to the next-hop node determined in S602.

The first node transmits the data packet including the BAP header to the next-hop node based on the determined next-hop node. The next-hop node may repeat S601 and S602 until the data packet including the BAP header is sent to the destination node. After receiving the data packet that includes the BAP header, the destination node may read the BAP address of the destination node in the BAP header, determine that the destination node is the destination node, and remove the BAP header. Optionally, the destination node may read the first information in the BAP header or skip reading the first information in the BAP header.

It should be understood that, for the method for the first node to determine the destination node of the data packet, reference may be made to content in Embodiments 1 and 2; and for the method for the first node to determine the routing path of the data packet, reference may be made to content in Embodiments 3 and 4. Details are not described herein again.

In addition, it should be understood that the foregoing embodiments may also be applied to routing between different IAB nodes. For example, as shown in FIG. 3, IAB node 4 generates a data packet, where a destination node of the data packet is IAB node 1. IAB node 4 then adds a BAP header to the data packet, determines that a next-hop node is IAB node 2, and sends the data packet including the BAP header to IAB node 2. IAB node 2 determines that the BAP header does not need to be modified, determines that a next-hop node is IAB node 1 based on the BAP header, and sends the data packet including the BAP header to IAB node 1. IAB node 1 reads the BAP header, determines that IAB node 1 is the destination node, and then removes the BAP header to parse the data packet.

With the foregoing method, after receiving the data packet, the first node determines the BAP header in the data packet and sends the data packet including the BAP header to the destination node based on the BAP header. In this way, routing of the data packet is enabled, thereby implementing data packet offloading in an IAB network.

Based on the foregoing embodiments, a routing solution for IAB uplink transmission and a routing solution for IAB downlink transmission are described in detail.

Figure 7:
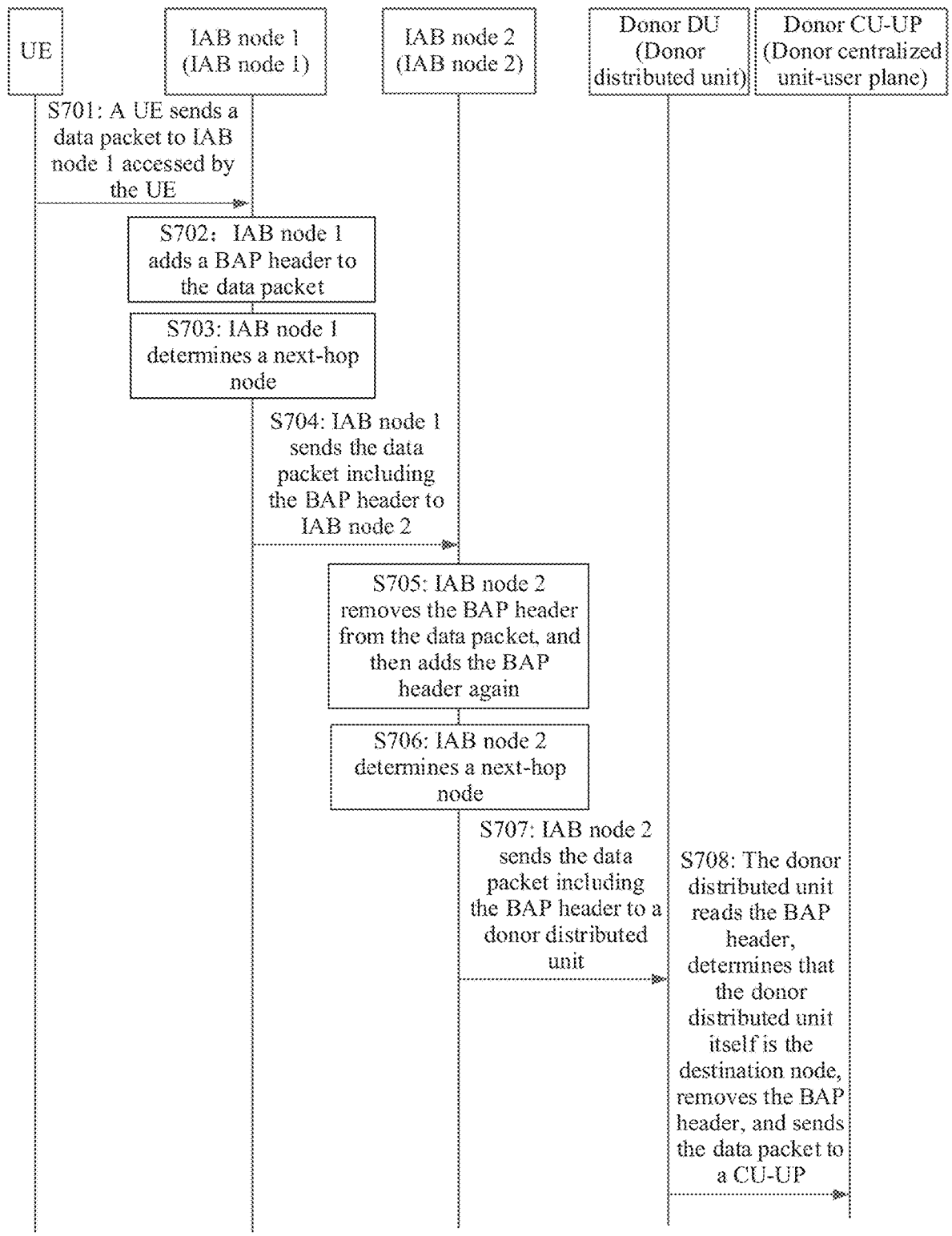
FIG. 7 is a first schematic diagram of a routing solution for IAB uplink transmission according to this application.
Figure 8:
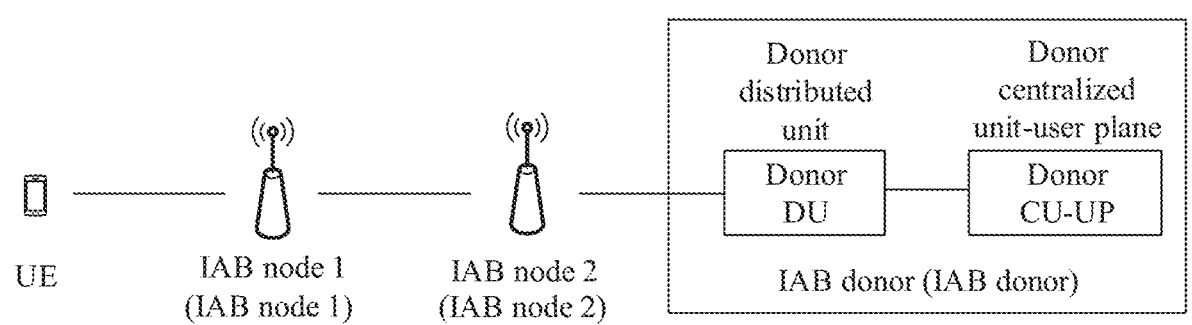
FIG. 8 is a second schematic diagram of a routing solution for IAB uplink transmission according to this application.

FIG. 7 and FIG. 8 are schematic diagrams of a routing solution for IAB uplink transmission.

S701: A UE sends a data packet to IAB node 1 accessed by the UE.

S702: IAB node 1 adds a BAP header to the data packet.

The BAP header includes a BAP ID of a donor DU and first information, where the first information includes an indication field, the indication field indicates "1", and the first information further includes a routing path identifier of the data packet.

Specifically, IAB node 1 determines an IP address of IAB node 1 and a mapping relationship between the IP address of IAB node 1 and the BAP ID of the donor DU, to determine the BAP ID of the donor DU.

A routing path of the data packet is a first path between IAB node 1 and the donor DU, and the first path herein may be a routing path with a highest priority in routing paths between IAB node 1 and the donor DU in a routing table of IAB node 1.

S703: IAB node 1 determines a next-hop node.

Specifically, the routing table of IAB node 1 includes the BAP ID of the donor DU, a next-hop node corresponding to the donor DU, and a routing path identifier corresponding to the donor DU. Therefore, IAB node 1 may uniquely determine one next-hop node, that is, IAB node 2, based on the BAP ID of the donor DU and the routing path identifier of the data packet.

S704: IAB node 1 sends the data packet including the BAP header to IAB node 2.

S705: IAB node 2 removes the BAP header from the data packet, and then adds the BAP header again.

The BAP header includes the BAP ID of the donor DU and first information, where the first information includes an indication field, the indication field indicates "1", and the first information further includes a routing path identifier of the data packet.

Specifically, IAB node 2 determines the IP address of IAB node 1 and the mapping relationship between the IP address of IAB node 1 and the BAP ID of the donor DU, to determine the BAP ID of the donor DU.

A routing path of the data packet is a first path between IAB node 2 and the donor DU, and the first path herein may be a routing path with a highest priority in routing paths between IAB node 2 and the donor DU in a routing table of LAB node 2.

S706: IAB node 2 determines a next-hop node.

Specifically, the routing table of IAB node 2 includes the BAP ID of the donor DU, a next-hop node corresponding to the donor DU, and a routing path identifier corresponding to the donor DU. Therefore, IAB node 2 may uniquely determine one next-hop node, that is, the donor DU, based on the BAP ID of the donor DU and the routing path identifier of the data packet.

S707: IAB node 2 sends the data packet including the BAP header to the donor DU.

S708: The donor DU reads the BAP header, determines that the donor DU is the destination node, removes the BAP header, and then sends the data packet to a donor CU-UP.

Figure 9:
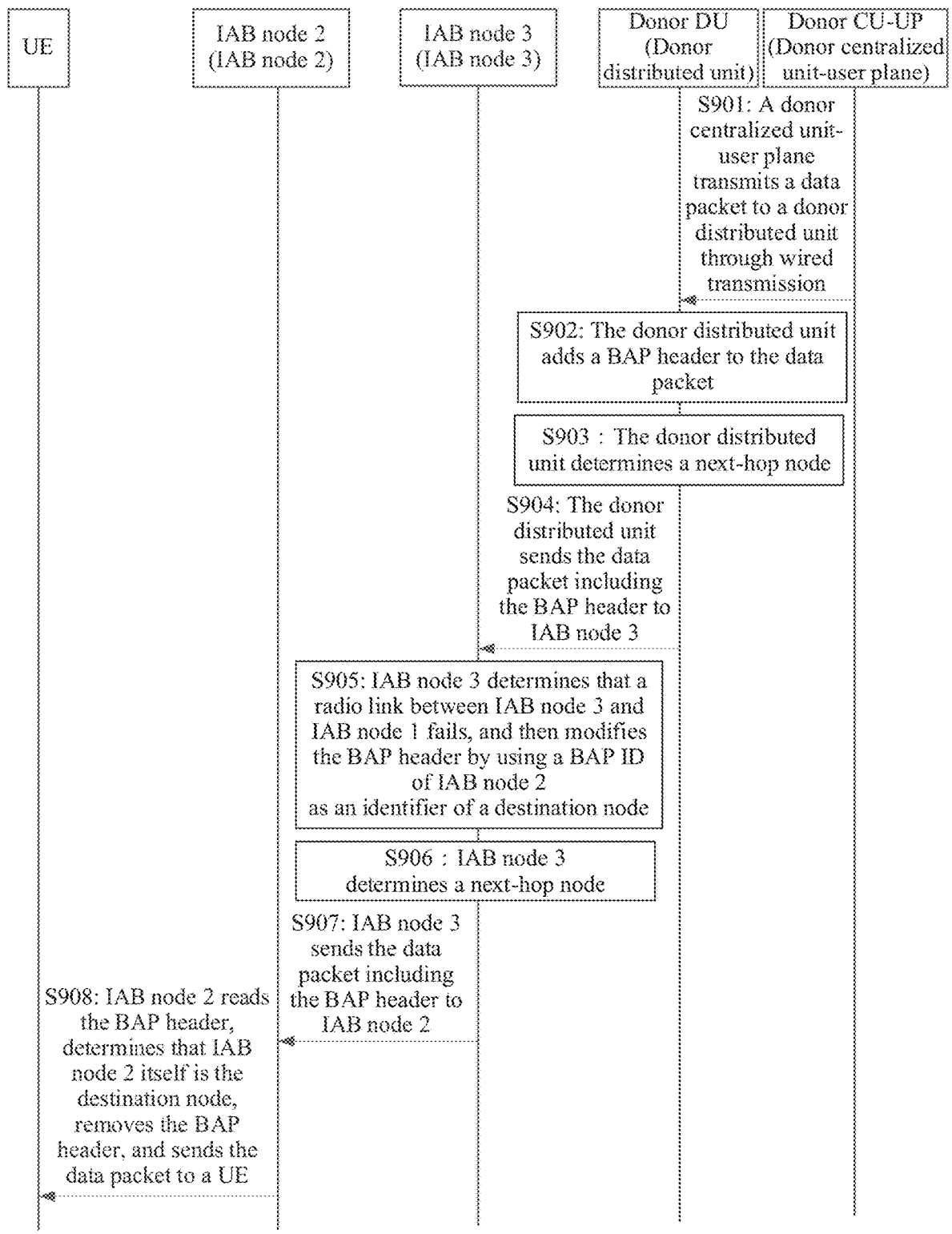
FIG. 9 is a first schematic diagram of a routing solution for IAB downlink transmission according to this application.
Figure 10:
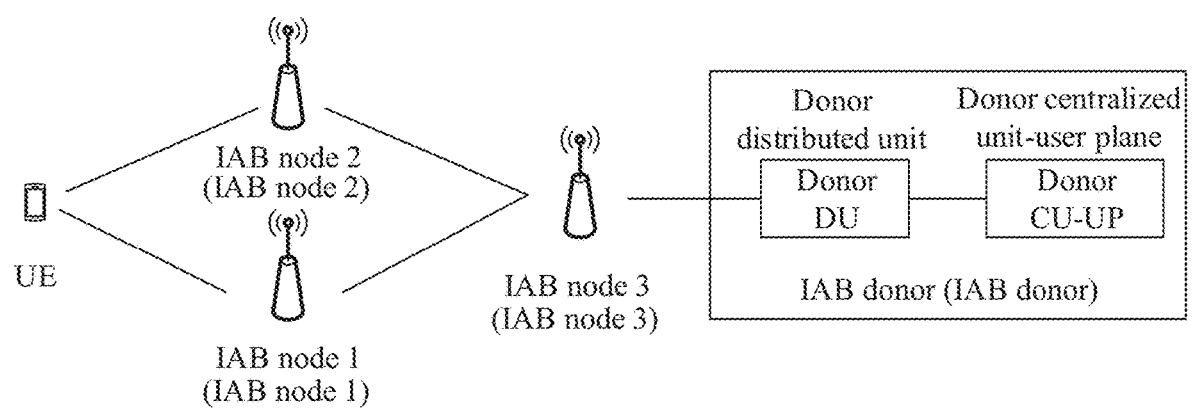
FIG. 10 is a second schematic diagram of a routing solution for IAB downlink transmission according to this application.

FIG. 9 and FIG. 10 are schematic diagrams of a routing solution for IAB downlink transmission.

S901: A donor CU-UP transmits a data packet to a donor DU through wired transmission.

S902: The donor DU adds a BAP header to the data packet.

The BAP header includes a BAP ID of IAB node 1 and first information, where the first information is a routing path identifier of the data packet, and the routing path identifier of the data packet is a first value, indicating to disable the routing path identifier of the data packet.

The donor DU determines the BAP ID of IAB node 1 based on an IP address of IAB node 1 and a mapping relationship between the IP address of IAB node 1 and the BAP ID of IAB node 1.

S903: The donor DU determines a next-hop node.

A routing table of the donor DU includes the BAP ID of IAB node 1 and a next-hop node corresponding to IAB node 1. Herein, IAB node 1 corresponds to one next-hop node, that is, IAB node 3. Therefore, the donor DU determines that IAB node 3 is the next-hop node.

S904: The donor DU sends the data packet including the BAP header to IAB node 3.

S905: IAB node 3 determines that a radio link between IAB node 3 and IAB node 1 fails, and then modifies the BAP header by using a BAP ID of IAB node 2 as a BAP address of a destination node.

IAB nodes accessed by a UE that receives the data packet include IAB node 1 and IAB node 2.

S906: IAB node 3 determines a next-hop node.

Specifically, a routing table of IAB node 3 includes the BAP ID of IAB node 2 and a next-hop node corresponding to IAB node 2. Therefore, IAB node 3 may determine one next-hop node, that is, IAB node 2, based on the BAP ID of IAB node 2.

S907: IAB node 3 sends the data packet including the BAP header to IAB node 2.

S908: IAB node 2 reads the BAP header, determines that IAB node 2 is the destination node, removes the BAP header, and sends the data packet to a specific UE.

For example, IAB node 2 determines a destination UE based on a tunnel end point ID (TEID) in a GTP-U.

In the foregoing embodiments provided in this application, various solutions of the communication method provided in the embodiments of this application are separately described from perspectives of each network element and interaction between network elements. It may be understood that, to implement the foregoing functions, each network element, such as the source node, the target node, or the first node, includes a corresponding hardware structure and/or software module for performing each function. A person skilled in the art should easily be aware that, in combination with units and algorithm steps of the examples described in the embodiments disclosed in this specification, this application can be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

Figure 11:
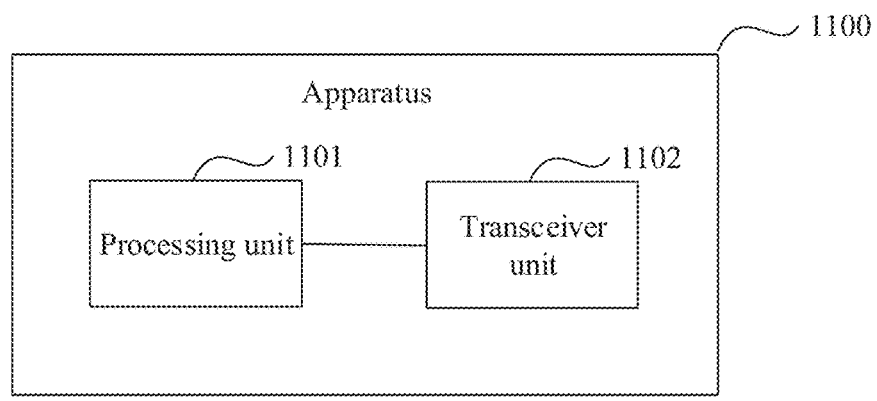
FIG. 11 is a first schematic diagram of a structure of an apparatus according to this application.

Same as the foregoing concept, as shown in FIG. 11, an embodiment of this application further provides an apparatus 1100. The apparatus 1100 includes a transceiver unit 1102 and a processing unit 1101.

In an example, the apparatus 1100 is configured to implement functions of the first node in the foregoing method. The apparatus may be an IAB node, or may be a chip in the IAB node. Alternatively, the apparatus may be a donor DU, or may be a chip in the donor DU. The transceiver unit 1102 receives a data packet. The processing unit 1101 determines a Backhaul Adaptation Protocol (BAP) header in the data packet. The BAP header includes a BAP address of a destination node of the data packet and first information. The first information is used to determine whether the BAP header includes a routing path identifier of the data packet. The processing unit 1101 sends the data packet including the BAP header to the destination node based on the BAP header through the transceiver unit 1102.

For specific execution processes of the processing unit 1101 and the transceiver unit 1102, refer to the descriptions in the foregoing method embodiments. Division into modules in this embodiment of this application is an example, is merely logical function division, and may be other division during actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

In another optional variation, the apparatus may be a chip system. In this embodiment of this application, the chip system may include a chip, or may include a chip and another discrete component. For example, the apparatus includes a processor and an interface, and the interface may be an input/output interface. The processor performs a function of the processing unit 1101, and the interface performs a function of the transceiver unit 1102. The apparatus may further include a memory. The memory is configured to store a program that can be run on the processor. When executing the program, the processor implements the methods in the foregoing embodiments.

Figure 12:
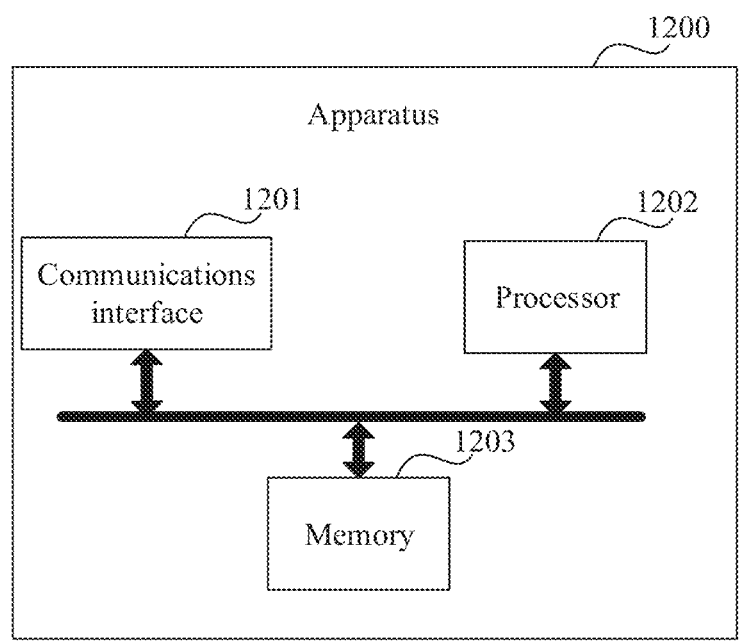
FIG. 12 is a second schematic diagram of a structure of an apparatus according to this application.

Same as the foregoing concept, as shown in FIG. 12, an embodiment of this application further provides an apparatus 1200. The apparatus 1200 includes a communication interface 1201, at least one processor 1202, and at least one memory 1203. The communication interface 1201 is configured to communicate with another device by using a transmission medium, so that an apparatus used in the apparatus 1200 may communicate with the another device. The memory 1203 is configured to store a computer program. The processor 1202 invokes the computer program stored in the memory 1203 to send and receive data through the communication interface 1201, to implement the methods in the foregoing embodiments.

For example, when the apparatus is a first node, the memory 1203 is configured to store a computer program. The processor 1202 invokes the computer program stored in the memory 1203 to perform, through the communication interface 1201, the method performed by the network device in the foregoing embodiments. In this embodiment of this application, the communication interface 1201 may be a transceiver, a circuit, a bus, a module, or a communication interface of another type. The processor 1202 may be a general-purpose processor, a digital signal processor, an application-specific integrated circuit, a field programmable gate array or another programmable logic device, a discrete gate or a transistor logic device, or a discrete hardware component, and may implement or execute methods, steps, and logical block diagrams that are disclosed in the embodiments of this application. The general-purpose processor may be a microprocessor, any conventional processor, or the like. The steps of the methods disclosed with reference to the embodiments of this application may be directly performed and completed by a hardware processor, or may be performed and completed by using a combination of hardware and software modules in the processor. The memory 1203 may be a non-volatile memory, for example, a hard disk drive (HDD) or a solid-state drive (SSD), or may be a volatile memory, for example, a random-access memory (RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function. The memory 1203 is coupled to the processor 1202. Coupling in this embodiment of this application may be indirect coupling or a communication connection between apparatuses, units, or modules in an electrical form, a mechanical form, or another form, and is used for information exchange between the apparatuses, the units, or the modules. In another implementation, the memory 1203 may alternatively be located outside the apparatus 1200. The processor 1202 may cooperate with the memory 1203. The processor 1202 may execute the program instructions stored in the memory 1203. At least one of the at least one memory 1203 may alternatively be included in the processor 1202. A connection medium between the communication interface 1201, the processor 1202, and the memory 1203 is not limited in this embodiment of this application. For example, in FIG. 12, in this embodiment of this application, the memory 1203, the processor 1202, and the communication interface 1201 may be connected by using a bus. The bus may be classified into an address bus, a data bus, a control bus, and the like.

It may be understood that the apparatus in the embodiment shown in FIG. 11 may be implemented by using the apparatus 1200 shown in FIG. 12. Specifically, the processing unit 1101 may be implemented by the processor 1202, and the transceiver unit 1102 may be implemented by the communication interface 1201.

An embodiment of this application further provides a computer-readable storage medium. The computer-readable storage medium stores a computer program. When the computer program is run on a computer, the computer is enabled to perform the methods in the foregoing embodiments.

All or some of the methods in the embodiments of this application may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or the functions according to the embodiments of the present invention are all or partially generated. The computer may be a general-purpose computer, a dedicated computer, a computer network, a network device, user equipment, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

The foregoing embodiments are merely used to describe the technical solutions of this application in detail. The descriptions of the foregoing embodiments are merely intended to help understand the methods in the embodiments of the present invention, and shall not be construed as a limitation on the embodiments of the present invention.

Variations or replacements readily figured out by a person skilled in the art shall fall within the protection scope of the embodiments of the present invention.

What is claimed is:

1. A downlink data transmission method, comprising:
obtaining, by a first node, a mapping relationship between an Internet Protocol (IP) address of a destination node configured by a donor centralized unit (donor CU) and a Backhaul Adaptation Protocol (BAP) address of the destination node, wherein the first node is a donor distributed unit (donor DU);
determining, by the first node, the BAP address of the destination node based on the mapping relationship and the IP address of the destination node that is carried in a downlink data packet, wherein a BAP header of the downlink data packet includes first information indicating that the BAP header does not include a routing path identifier of the downlink data packet, and wherein the BAP header of the downlink data packet includes a BAP address of a source node of the downlink data packet;
determining, by the first node, a first path between the first node and the destination node based on a differentiated services code point (DSCP) or a flow label carried in the downlink data packet; and
sending, by the first node, the downlink data packet to the destination node on the first path based on the BAP address of the destination node.

2. The method according to claim 1, wherein the determining, by the first node, a first path between the first node and the destination node based on a DSCP or a flow label carried in the downlink data packet comprises:
obtaining, by the first node, a second mapping relationship between the DSCP or the flow label configured by the donor CU and the first path; and
determining, by the first node, the first path based on the DSCP or the flow label and the second mapping relationship.

3. The method according to claim 1, further comprising:
determining, by the first node, to add the BAP header to the downlink data packet, wherein the BAP header comprises the BAP address of the destination node and an identifier of the first path.

4. The method according to claim 1, wherein the first path is a routing path with a routing path identifier that is unique in an entire network or in the donor CU.

5. The method according to claim 1, wherein the destination node is an access IAB (integrated access and backhaul) node of a terminal device that receives the downlink data packet.

6. A first node, comprising:
at least one processor; and
one or more memories coupled to the at least one processor and storing programming instructions for execution by the at least one processor to perform operations comprising:
obtaining a mapping relationship between an Internet Protocol (IP) address of a destination node configured by a donor centralized unit (donor CU) and a Backhaul Adaptation Protocol (BAP) address of the destination node, wherein the first node is a donor distributed unit (donor DU);
determining the BAP address of the destination node based on the mapping relationship and the IP address of the destination node that is carried in a downlink data packet, wherein a BAP header of the downlink data packet includes first information indicating that the BAP header does not include a routing path identifier of the downlink data packet, and wherein the BAP header of the downlink data packet includes a BAP address of a source node of the downlink data packet;
determining a first path between the first node and the destination node based on a differentiated services code point (DSCP) or a flow label carried in the downlink data packet; and
sending the downlink data packet to the destination node on the first path based on the BAP address of the destination node.

7. The first node according to claim 6, wherein the determining a first path between the first node and the destination node based on a DSCP or a flow label carried in the downlink data packet comprises:
obtaining a second mapping relationship between the DSCP or the flow label configured by the donor CU and the first path; and
determining the first path based on the DSCP or the flow label and the second mapping relationship.

8. The first node according to claim 6, the operations further comprising:
determining to add the BAP header to the downlink data packet, wherein the BAP header comprises the BAP address of the destination node and an identifier of the first path.

9. The first node according to claim 6, wherein the first path is a routing path with a routing path identifier that is unique in an entire network or in the donor CU.

10. The first node according to claim 6, wherein the destination node is an access IAB (integrated access and backhaul) node of a terminal device that receives the downlink data packet.

11. A non-transitory computer readable medium storing one or more programming instructions executable by at least one processor to cause a first node to perform operations comprising:
obtaining a mapping relationship between an Internet Protocol (IP) address of a destination node configured by a donor centralized unit (donor CU) and a Backhaul Adaptation Protocol (BAP) address of the destination node, wherein the first node is a donor distributed unit (donor DU);
determining the BAP address of the destination node based on the mapping relationship and the IP address of the destination node that is carried in a downlink data packet, wherein a BAP header of the downlink data packet includes first information indicating that the BAP header does not include a routing path identifier of the downlink data packet, and wherein the BAP header of the downlink data packet includes a BAP address of a source node of the downlink data packet;
determining a first path between the first node and the destination node based on a differentiated services code point (DSCP) or a flow label carried in the downlink data packet; and
sending the downlink data packet to the destination node on the first path based on the BAP address of the destination node.

12. The non-transitory computer readable medium according to claim 11, wherein the determining a first path between the first node and the destination node based on a DSCP or a flow label carried in the downlink data packet comprises:
obtaining a second mapping relationship between the DSCP or the flow label configured by the donor CU and the first path; and determining the first path based on the DSCP or the flow label and the second mapping relationship.

13. The non-transitory computer readable medium according to claim 11, the operations further comprising:
determining to add the BAP header to the downlink data packet, wherein the BAP header comprises the BAP address of the destination node and an identifier of the first path.

14. The non-transitory computer readable medium according to claim 11, wherein the first path is a routing path with a routing path identifier that is unique in an entire network or in the donor CU.

15. The non-transitory computer readable medium according to claim 11, wherein the destination node is an access IAB (integrated access and backhaul) node of a terminal device that receives the downlink data packet.

* * * * *